(12) United States Patent
Otsuka et al.

(10) Patent No.: US 6,386,099 B1
(45) Date of Patent: May 14, 2002

(54) CONTINUOUS HIGH-SPEED PICKLE INJECTOR

(75) Inventors: Shoji Otsuka, Tokyo; Shinji Samusawa, Tsuchiura; Takayuki Takahashi, Tsuchiura; Shigeaki Watanabe, Tsuchiura, all of (JP)

(73) Assignee: Prima Meat Packers, Ltd., Tokyo (JP)

( * ) Notice: Subject to any disclaimer, the term of this patent is extended or adjusted under 35 U.S.C. 154(b) by 0 days.

(21) Appl. No.: 09/801,726

(22) Filed: Mar. 9, 2001

(51) Int. Cl.⁷ ............................. A23L 1/00; A23L 1/31; A22C 17/00
(52) U.S. Cl. ............................. 99/487; 99/533; 99/535
(58) Field of Search ........................ 99/487, 533, 532, 99/535, 516; 426/281, 323, 574, 641; 452/62, 57, 66

(56) References Cited

U.S. PATENT DOCUMENTS

| | | |
|---|---|---|
| 4,286,510 A | 9/1981 | Prosenbauer |
| 5,071,666 A | * 12/1991 | Handel et al. ............... 426/281 |
| 5,913,968 A | 6/1999 | Thomas |
| 5,996,481 A | * 12/1999 | Townsend ..................... 99/533 |
| 6,014,926 A | * 1/2000 | Tanaka et al. ................. 99/487 |

FOREIGN PATENT DOCUMENTS

| | | |
|---|---|---|
| EP | 0 561 105 A1 | 9/1993 |
| EP | 0 879 561 A1 | 11/1998 |
| JP | 11-89542 | 4/1999 |
| WO | WO 98/47382 | 10/1998 |

* cited by examiner

*Primary Examiner*—Timothy F. Simone
(74) *Attorney, Agent, or Firm*—Venable; Robert Kinberg; Catherine M. Voorhees (57) ABSTRACT

A continuous high-speed pickle injector is provided with improved productivity that can inject a liquid substance such as brine for curing, seasoning or the like into a block of meat such as pork, beef, livestock meat and the like continuously, and disperse the liquid substance uniformly. A pickle injector which can inject a liquid substance such as brine for curing and the like into a block of meat being conveyed continuously while gradually raising the injection pressure from 0 or a low pressure includes two or more injecting sections being able to repeat an injecting operation, that is, from the start to the completion of the injection of a liquid substance. The two or more injecting sections inject a liquid substance while moving at a speed synchronized with the conveying speed of a block of meat continuously being conveyed during the operation of injection. The timing of the injecting operation for each injecting section is controlled.

7 Claims, 5 Drawing Sheets

CONTINUOUS HIGH-SPEED PICKLE INJECTOR

BACKGROUND OF THE INVENTION

1. Field of the Invention

The present invention relates to a modification of the pickle injector developed by the inventors of the present invention and described in Japanese Patent Laid-open No. 89542/1999. The present invention relates to a continuous high-speed pickle injector with improved productivity that can inject a liquid substance such as brine for curing, seasoning or the like into a block of meat such as pork, beef, livestock meat and the like continuously, and disperse the liquid substance uniformly.

2. Description of the Related Art

In meat processing, there is a need for uniform dispersion of a curing agent or seasoning in meat, and a multi-needle pickle injector has been used. However, immediately after injection of a liquid using this known injector, the liquid accumulates in portions of meat where the needles have been inserted. Therefore, the meat processing cannot advance to the next step unless a dynamic stimulus is given with a tumbling machine, a massage machine or the like, to the meat with the accumulated liquid. After such a stimulus, the block of meat is cured until the brine for curing or the seasoning liquid permeates through the block of meat so it is uniformly dispersed. These procedure can take several days. Accordingly, a problem exists with known processes in that several days are necessary to salt loin ham or boneless ham, or to season roast pork.

Moreover, the injection pressure of brine for curing in the multi-needle pickle injector is limited to about 12 kg/cm² owing to its structure. A low-molecular substance such as salt can easily move inside the block of meat. However, high-molecular substances, or substances having a high reactivity with meat constituent substances cannot easily move inside the block of meat. As a result, the seasoning liquid, which can contain both low and high molecular substances, is defectively dispersed.

A needle-less pickle injector which solved the above-mentioned problems was developed by the inventors of the present invention. That is, in Japanese Patent Laid-open No. 89542/1999 in the names of the inventors of the present invention, a practical pickle injector is disclosed wherein brine for curing or seasoning liquid is uniformly, efficiently and continuously dispersed into a block of meat, without deteriorating meat property. This practical pickle injector is not only for thin, but also thick, raw-material meats, and for raw-material meats different in configuration and size. Curing or seasoning can be accomplished with the above needle-less pickle injector without operating a tumbling machine, a massage machine or the like for a lengthy time. And even when there is a difference of injection resistance in meat property, the brine for curing or the seasoning liquid can be uniformly dispersed.

SUMMARY OF THE INVENTION

An Object to be Attained by the Invention

An object of the present invention is to provide a pickle injector with which continuous high-speed process is possible, and the productivity of a raw ham or the like would be improved further compared with the case when the pickle injector shown in Japanese Patent Laid-open No. 89542/1999 is used.

Means to Attain the Object

After intensive study to attain the above-mentioned object, the inventors have found that it would be possible to increase the efficiency of injection per unit time and to improve the productivity by modifying the conveying method of a block of meat to a continuous method, by locating two or more injecting sections which can repeat an injecting operation, and can inject a liquid substance while moving at a speed synchronized with the conveying speed of a block of meat being conveyed continuously during the injecting operation, and by controlling the timing of injecting operation of each injecting section.

This invention relates to a pickle injector for injecting a liquid substance into a block of meat which comprises a continuous conveying means having one or more rows (lines) for conveying a block of meat; two or more injecting sections that can inject a liquid substance into a block of meat while moving at a speed synchronized with a conveying speed of a block of meat continuously being conveyed by the continuous conveying means; a pressure controller having a pressure control mechanism which can gradually raise the injection pressure from 0 or a low pressure to inject a liquid substance into a block of meat from the injecting section.

This invention also relates to a pickle injector as described above, wherein a timing is set so that only one of the two or more injecting sections can perform the injecting operation of injecting a liquid substance to a block of meat.

A pickle injector according to the invention might also include an injecting section which moves vertically while moving at a speed synchronized with a conveying speed of a block of meat. Another pickle injector according to the invention would locate the two or more injecting sections in alignment above and along the continuously conveying direction of a block of meat.

A pickle injector with aligned injecting sections would preferably have the distance between the two or more injecting sections of a length figured out by multiplying the product of the length of the injecting sections along the continuously conveying direction of a block of meat and the number of the injecting sections by an integer. Such a pickle injector according to the invention would have at least one set of the two or more injecting sections located above each one of two or more lines for conveying a block of meat. Finally, a pickle injector according to the invention would have a pressure control mechanism which can gradually raise the injection pressure from 0 or a low pressure that includes two or more high-pressure pumps.

DETAILED DESCRIPTION OF THE INVENTION

Mode for Carrying out the Invention

The injector of the present invention is a device for injecting a liquid substance into a block of meat which comprises a continuous conveying means having one or more rows for conveying a block of meat; two or more injecting sections that can inject a liquid substance into a block of meat while moving at a speed synchronized with a conveying speed of a block of meat continuously being conveyed by the continuous conveying means; a pressure controller having a pressure control mechanism which can gradually raise the injection pressure from 0 or a low pressure in injecting a liquid substance into a block of meat from the injecting section.

In the present invention, examples of meat include pork, meat, poultry meat, horse meat, mutton, internal-organ meat, meat with bones and meat with skin, fish meat. Any type of meat for food can be used.

As a continuous conveying means for a block of meat of the present invention, any means will suffice as long as it can continuously convey a block of meat with a prescribed width. For example, an edgeless belt conveyer with upright walls on both sides along the conveying direction is a preferred embodiment. Also, conveying means can be located parallelly in two or more rows on demand. The conveying speed where conveying means is located parallelly in n rows, for instance, is preferably set to be 1/n of the conveying speed where conveying means is located in one row.

In the present invention, examples of a liquid substance include brine for curing, seasoning liquid, modifier of lipid or another tissue, natural keeping agent, natural colorant, enzyme, solution of microorganism or the like and dispersion suspension. A fluid substance including gas or any other liquid substance can be used as long as it can be injected from a coherent stream injection nozzle or another injecting section into a block of meat.

As an injecting section of the present invention, any injecting section can be used as long as it can repeat the said injecting operations. An injecting operation begins at the start of the injection of a liquid substance and ends at the completion of the injection. Such an injecting operation can inject a liquid substance while moving at a speed synchronized with the conveying speed of a block of meat continuously being conveyed in the injecting operation, and the pickle injector of the present invention has two or more such injecting sections. Further, the injecting section can inject a liquid substance issuing from a high-pressure liquid generator and a pressure controller via a high-pressure piping into a block of meat. A specific example of the injecting section is a manifold for branching a single flow from the high-pressure piping to plural flows. A preferred manifold would have parallelly disposed pipings having coherent stream injection nozzles on the tip end of them inside itself. In injecting and dispersing a liquid substance into a block of meat with the pickle injector according to the invention, it is preferable to butt the tip end of the coherent stream injection nozzles against a block of meat, and then straightly inject the liquid substance through the coherent stream nozzles into the block of meat to inject and disperse the liquid substance therein.

The above-mentioned high-pressure liquid generator may be any mechanism, as long as it can increase the pressure of the liquid to a high level, for example, 7~3000 kg/cm$^2$. Examples of the high-pressure liquid generator include reciprocating pumps such as a plunger pump and a fluid pressure cylinder as well as pumps such as a rotation pump and a centrifugal pump. Members other than the pumps may be used, if the pressure of a liquid substance can be set high. By controlling the number of rotations of a motor, the plunger pump or another pump is operated and an output of the pump is controlled. In this or another case, the high-pressure liquid generator can be constituted integrally with the pressure controller described later.

The pressure controller of the present invention may be of any type if it has a pressure control mechanism which can gradually raise the injection pressure from 0 or a low pressure to a high pressure level. The pressure controller can be largely classified into a controller having a means for controlling the pressure in the high-pressure liquid generator, a controller having a means for controlling the pressure in the high-pressure piping or the injecting section and a controller having a combination of these means. A preferred controller having a means for controlling the pressure in the high-pressure liquid generator is a controller in which a plunger of a plunger pump is operated by controlling the number of rotations of the motor by using a servo motor, a stepping motor or a three-phase motor having an inverter in order to control an output of the high-pressure liquid generator, that is, the injection pressure.

The pickle injector of the present invention has high productivity and, as a result, an amount of injection per unit time increases naturally. Thus, the load to the high-pressure liquid generator using a servo motor or the like increases. Therefore, it is preferable to use a high-pressure pump of great ability in the piping unit. However, the high-pressure pump needs to be able to increase the flow amount of the pump and to have an ability to control a pressure precisely at the same time, because it is used also as a pressure control mechanism which can gradually raise the injection pressure from 0 or a low pressure to a high pressure level. The inventors of the present invention have found that it is more advantageous to use two or more small high-pressure pumps than to use one large high-pressure pump in consideration of the pressure controllability and the cost. When the number of the high-pressure pumps is increased by p-times compared with the conventional injectors, it is possible to increase the number of nozzles at the injecting section by p-times in order to accomplish the same injection pressure from each nozzles as that of the conventional injectors, and the productivity can be simply increased by p-times. By locating two injecting sections per one row of a continuous belt conveyer and performing an injecting operation of each injecting section sequentially and incessantly, injection frequency can be doubled, so the productivity would be increased by 2p-times by increasing the number of the high-pressure pumps by p-times, and the productivity could be further improved.

When the pickle injector with a pressure controller having a pressure control mechanism which can gradually raise the injection pressure from 0 or a low pressure to a higher pressure, as described in detail in Japanese Patent Laid-open No. 89542/1999, the rising rate of the injection pressure is usually set in the range of 100~20000 kg/cm$^2$ second. By raising the injection pressure gradually and continuously like this, it becomes possible to inject a liquid substance into a block of meat uniformly. When the coherent stream injection nozzle is used, the injected liquid substance is dispersed in a transverse direction at a predetermined depth by the resistance of meat tissue as a result of the injection and dispersion properties of the liquid substance into a block of meat. When the injection pressure is gradually raised, the injection depth changes in accordance with the injection pressure. The liquid substance is dispersed in the transverse direction by the resistance of meat tissue at the changed depth. Such phenomenon repeatedly occurs with the increase of the injection depth. Then, the liquid substance is uniformly dispersed from surface to bottom of the block of meat. Therefore, by gradually raising the injection pressure from 0 or a low pressure, a product superior in uniform dispersion of the injected liquid substance can be obtained.

As to the injection of a liquid substance into a block of meat by the pickle injector of the present invention, the injector is preferably set such that only one of the two or more injecting sections can perform an injecting operation, which is an injection of a liquid substance into a block of meat, and more preferably, such that any one of the two or more injecting sections can start sequentially to perform the injecting operations, that is, from the start to the completion of the injection of a liquid substance. With a continuous and sequential injection of a liquid substance by two or more injecting sections into a block of meat continuously being conveyed, it becomes possible to increase the injection frequency of a liquid substance per unit of time. For instance, it becomes possible to double the injection frequency by locating two injecting sections per one row of a continuous conveying belt conveyer and performing an injecting operation of each injecting section sequentially and incessantly as aforementioned, and the productivity could be doubled. Two or more injecting sections can be located in alignment along the continuously conveying direction of a block of meat, or at least one set of two or more injecting sections can be located above and along each one of two or more rows of a block of meat being continuously conveyed. When two or more injecting sections are located in one row, the distance between each injecting section is preferably a length figured out by multiplying the product of the length of the injecting sections along the continuously conveying direction of a block of meat and the number of the injecting sections by an integer in consideration of injecting an exact amount of a liquid substance. However, it is possible to inject overlappingly. For example, one injection operation begins in a first injecting section while another injection operation finishes in a second injecting section.

Each injecting section sequentially repeats the following actions: descent until the tip end of the nozzle touches a block of meat continuously being conveyed; move at a speed synchronized with the speed of a block of meat continuously being conveyed while the injecting operation is performed; ascent; move to the opposite direction of conveying direction of a block of meat and recovery; descent. It is preferable that such ascent and descent is made while moving at a speed synchronized with the continuously conveying speed of a block of meat in consideration of preventing the surface of the block of meat from damage. The operation timing of each of the two or more injecting sections is preferably set such that when one injecting section completes an injecting operation, another injecting section can start an injecting operation almost simultaneously. In that case, the injecting operation of one injecting section and generation of a high-pressure liquid in the high-pressure liquid generator are preferably set to be synchronized with each other.

It is preferable to raise the injection pressure to the maximum injection pressure for injecting a liquid substance into a block of meat. The maximum injection pressure can be regulated variously in accordance with physical properties of the block of meat (proportion of lean and fat, meat hardness, the presence of bones and the like), thickness and configuration of the block of meat, physical properties of the liquid substance (molecular weight of solute or dispersoid, viscosity, reactivity with meat components and the like), a distance between a tip end of the coherent stream injection nozzle and the block of meat and the like. The maximum injection pressure is usually set in the range of 300~2000 $kg/cm^2$. In this case, the high-pressure liquid generator in the pickle injector of the present invention preferably has an ability to apply various pressures in the range up to 3000 $kg/cm^2$. The maximum injection pressure and the like which can control the injection depth of a liquid substance injected into a block of meat is explained in detail in Japanese Patent Laid-open No. 89542/1999.

With the pickle injector of the present invention, as aforementioned, by controlling/adjusting the injection time elapsed until the maximum injection pressure of the liquid substance from the coherent stream injection nozzle is reached, the injection quantity of a liquid substance can be controlled. The injection time elapsed until the maximum injection pressure is reached can be set variously in accordance with the property of meat, physical properties of a liquid substance or the like. The injection time is usually set to be 0.05–10 seconds, preferably 0.1–5 seconds, more preferably 0.3–2 seconds.

And with the pickle injector of the present invention, by setting the pressure rising rate to 100~20000 $kg/cm^2$ .second, preferably 200~10000 $kg/cm^2$ .second, more preferably 1000~4000 $kg1cm^2$ .second, control is performed while injection is being performed, so that a liquid substance can be uniformly and efficiently dispersed in the block of meat.

Figure 1:
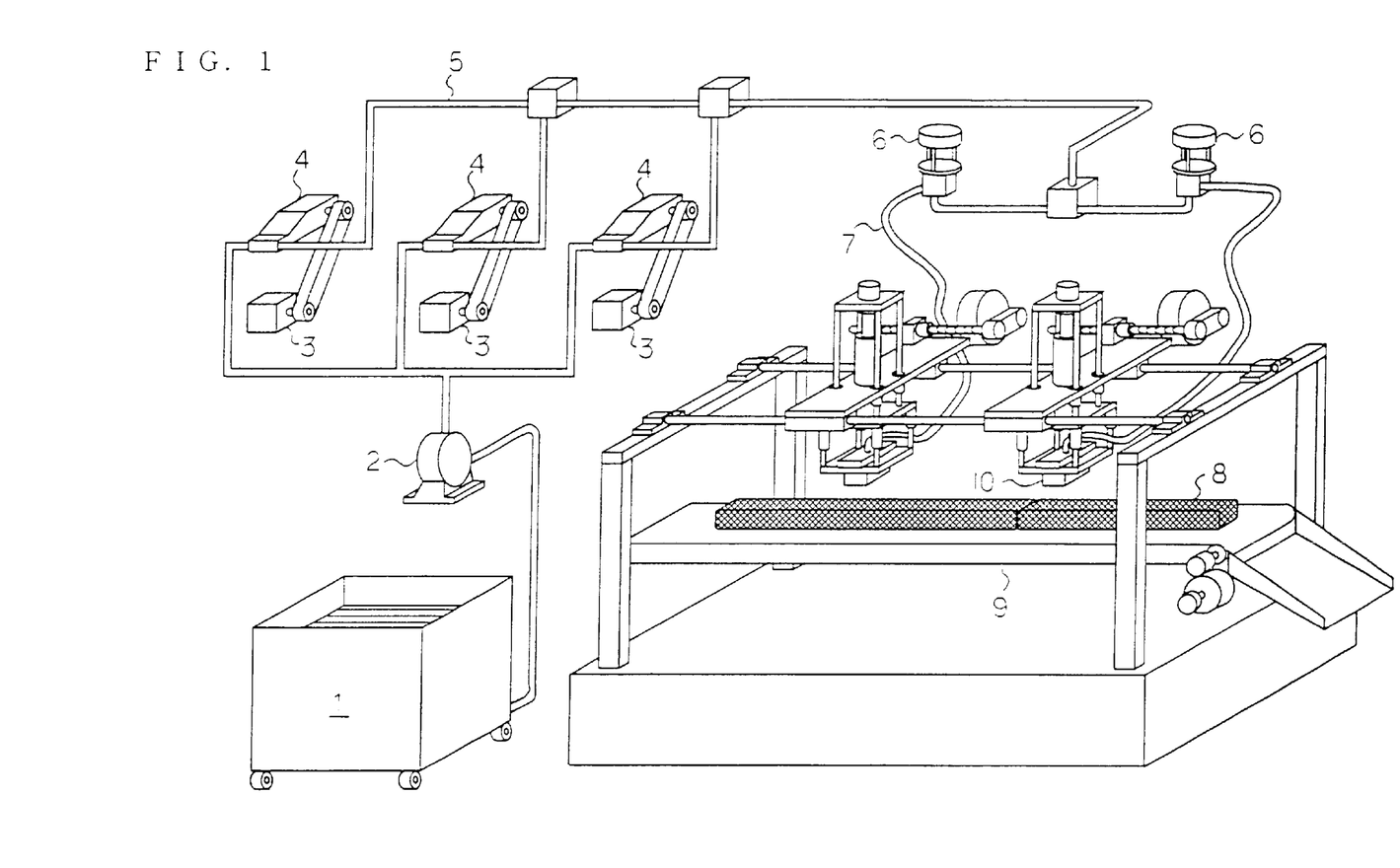
FIG. 1 is a general perspective view of the pickle injector of the present invention.
Figure 2:
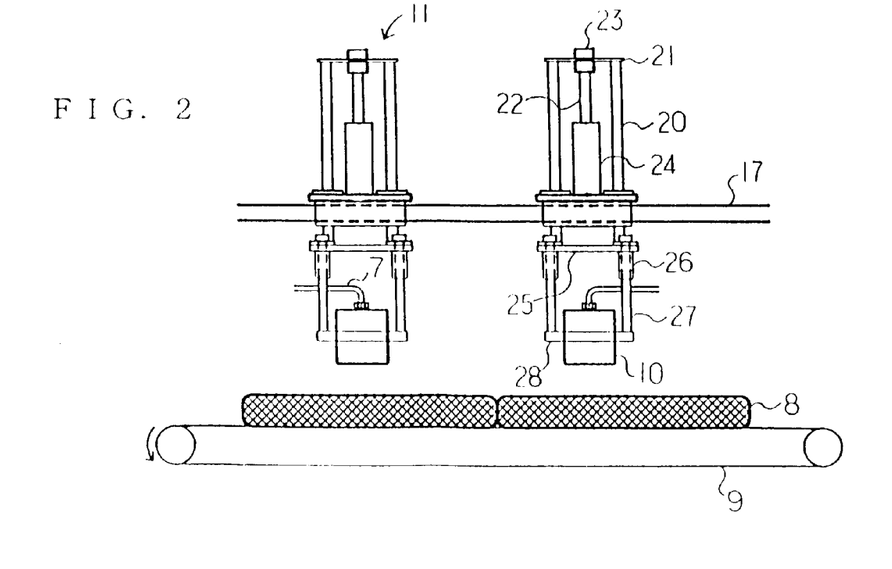
FIG. 2 is a front elevational view of an injecting section of the present invention.
Figure 3:
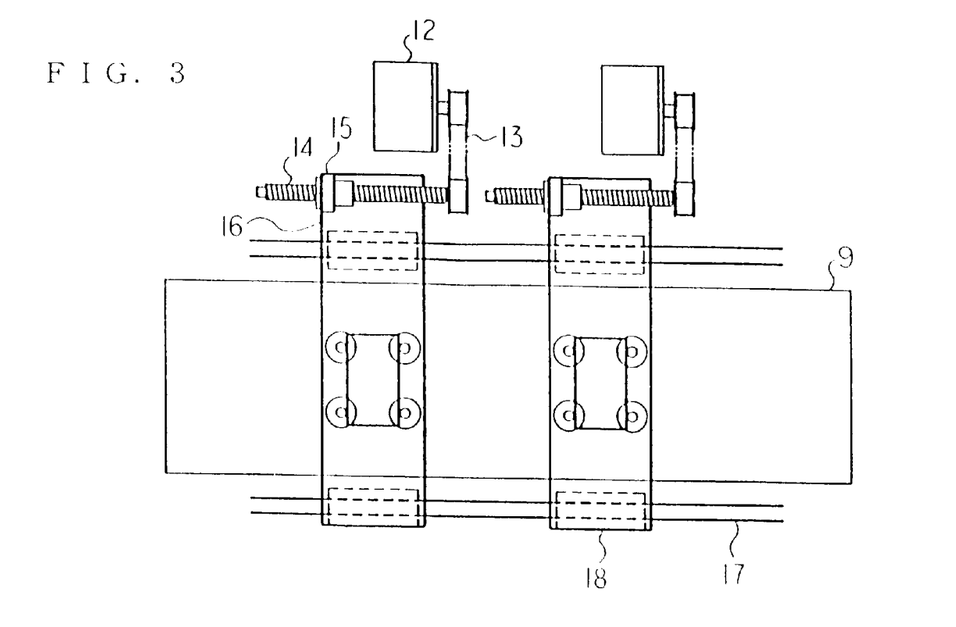
FIG. 3 is a plan view of an injecting section of the present invention.
Figure 4:
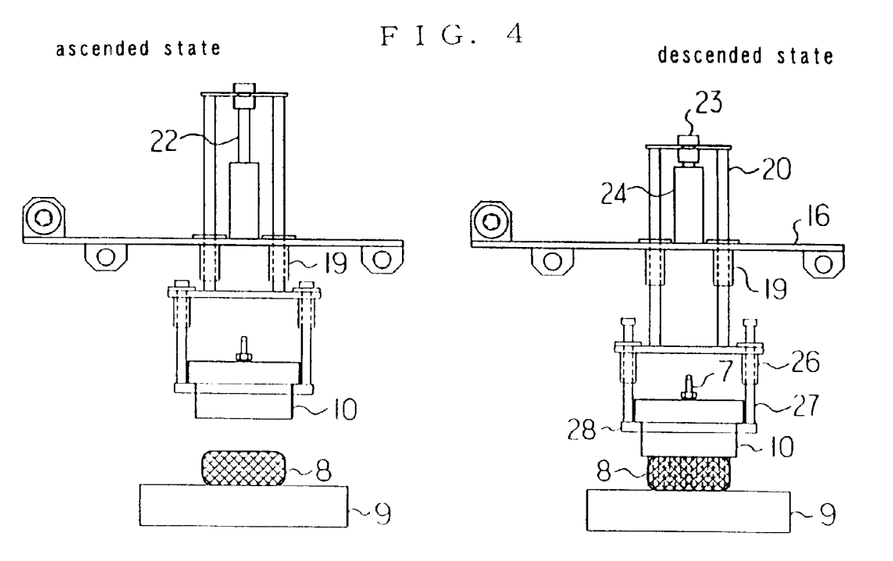
FIG. 4 is a side view of an injecting section of the present invention.
Figure 5:
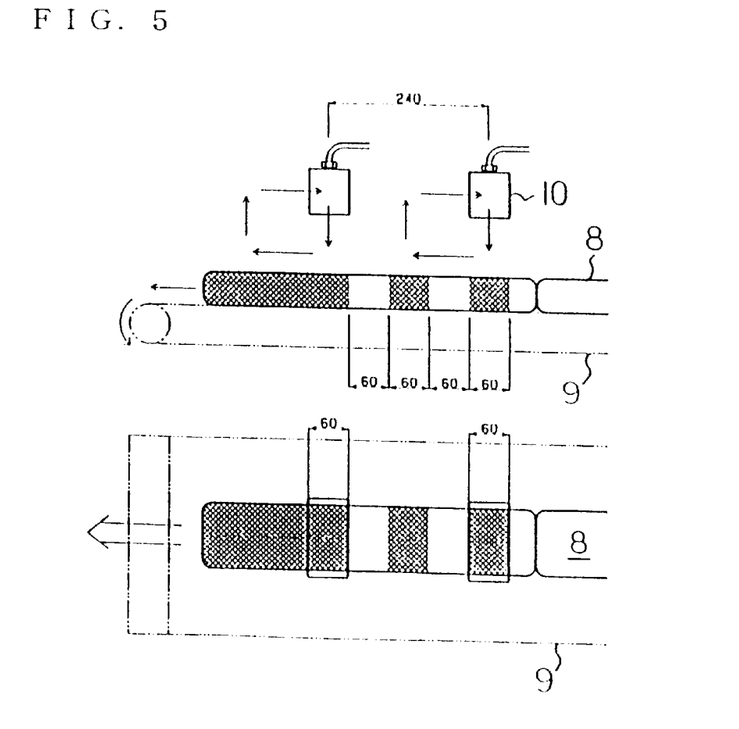
FIG. 5 is a view explaining an injecting operation where a continuous belt conveyer of the present invention has a width of one row.
Figure 6:
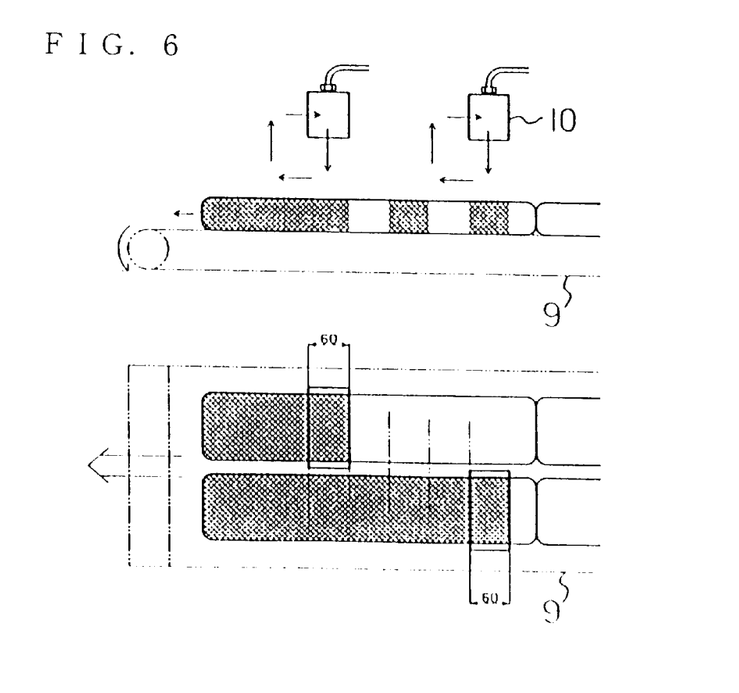
FIG. 6 is a view explaining an injecting operation where a continuous belt conveyer of the present invention has a width of two rows.
Figure 7:
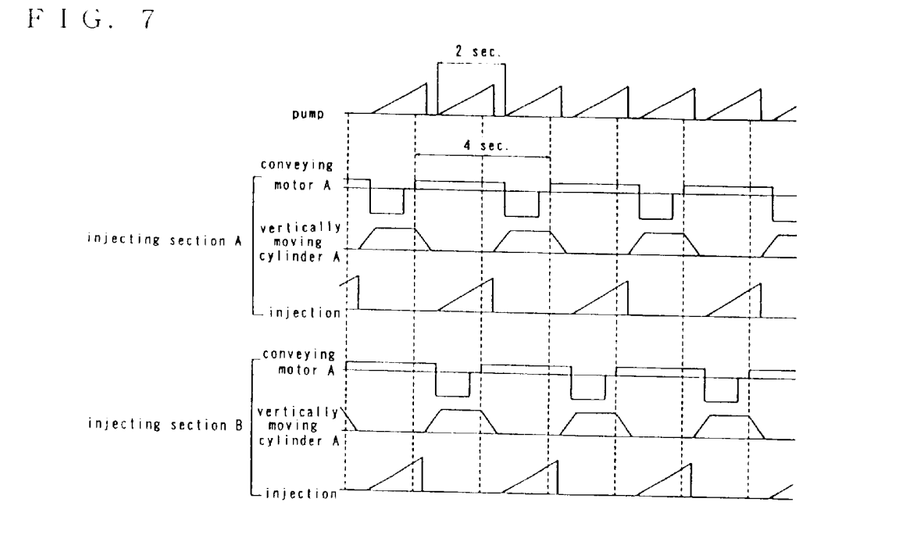
FIG. 7 is a view showing the timing chart of an injecting section of the present invention.
Figure 8:
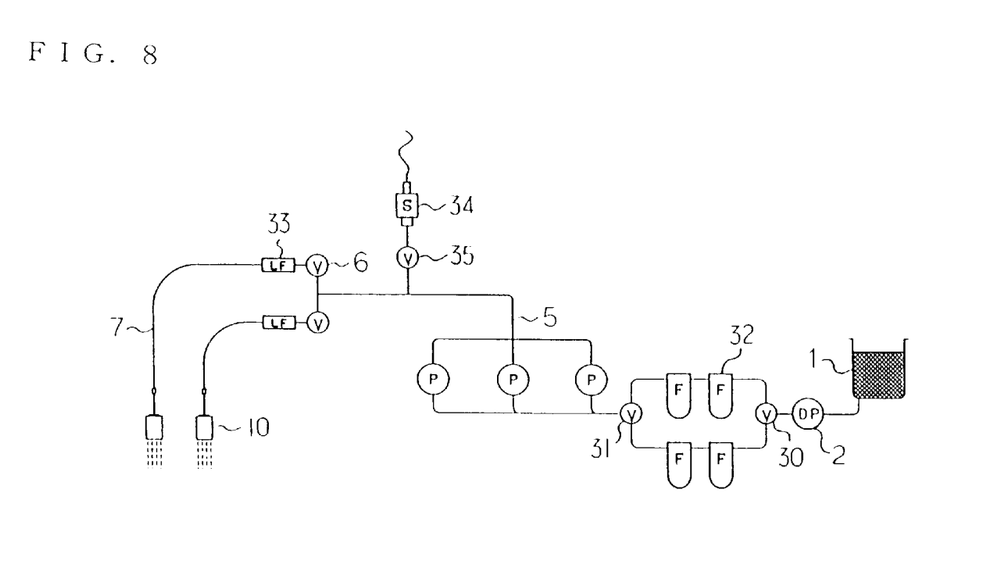
FIG. 8 is a view typically showing a structure of the piping unit for a liquid substance of the present invention.

The pickle injector having two injecting sections of the present invention, in particular, the mechanism, the movement and the like of the injecting sections will be described more concretely based on the drawings. FIG. 1 is a general perspective view of the pickle injector of the present invention. FIG. 2 is a front elevational view of an injecting section. FIG. 3 is a plan view of an injecting section. FIG. 4 is a side view of an injecting section. FIG. 5 is a view explaining an injecting operation where a continuous belt conveyer has a width of one row. FIG. 6 is a view explaining an injecting operation where a continuous belt conveyer has a width of two rows. FIG. 7 is a view showing the timing chart of an injecting section. FIG. 8 is a view typically showing a structure of the piping unit for a liquid substance.

In the pickle injector of the present invention shown in FIG. 1, the high-pressure liquid generator is formed integrally with the pressure controller, and the high-pressure liquid generator/pressure controller is mounted within a liquid tank 1 containing a liquid substance therein. The high-pressure liquid generator/pressure controller further includes: a diaphragm pump 2; a high-pressure piping 5 including a servo motor 3, a high-pressure plunger pump 4 and a stainless piping capable of withstanding pressure of 4200 $kg/cm^2$; a switch valve 6; and a flexible hose 7 capable of withstanding pressure of 3500 $kg/cm^2$. By operating the high-pressure plunger pump 4 with the servo motor 3, the liquid pressure from the liquid tank 1 can be gradually raised from 0 or a low pressure to a high pressure level. In FIG. 1, 8 represents a block of meat, 9 represents a continuous belt conveyer, and 10 represents an injecting section.

In FIGS. 2–4, an injecting means 11, where two injecting means 11 are aligned along the conveying direction of a block of meat 8 on a continuous belt conveyer 9, is shown. Each injecting means 11 comprises; a conveyance servo motor 12 for operating an injecting section 10; a timing belt 13 for transmitting the operation of a conveyance servo motor 12; a ball thread 14 regularly and reversely rotatable by a timing belt 13; a ball thread nut 15 for receiving ball thread 14; an injecting section holder 16 screwed by ball thread 14 and ball thread nut 15 such that injecting section holder 16 can move forward and backward freely along the conveying direction; two horizontal slide shafts 17 and a horizontal slide bearing 18 for sliding an injecting section (manifold) 10 smoothly along the conveying direction; a vertical slide upper shaft 20 which slides freely and vertically via a vertical slide bearing 19 disposed at an injecting section holder 16; a cylinder piston wherein an end portion 23 of a piston rod 22 is fixed to an upper connecting plate 21 fixed to a vertical slide upper shaft 20, and a lower end of a cylinder 24 of the piston is fixed to an injecting section holder 16; a vertical slide lower shaft 27 which slides freely and vertically via a vertical slide bearing 26 disposed in the vicinity of both ends of a lower connecting plate 25; an injecting section fixing plate 28 fixed to a vertical slide lower shaft 27; an injecting section (manifold) 10 having injecting nozzles in its lower end, which is fixed to an injecting section fixing plate 28. A flexible hose 7 for inducing a high-pressure liquid substance is connected to the above-mentioned injecting section (manifold) 10.

The operation mechanism of an injection section (manifold) as to the conveying direction is as follows: the operation of a conveyance servo motor 12 which is regularly and reversely rotatable in accordance with a signal from a timing controller (not shown) is transmitted to a ball thread 14 via a timing belt 13; ball thread 14 rotates regularly or reversely through a ball thread nut on injecting section holder 16; and as a result of screwing ball thread 14 into ball thread nut 15, injecting section holder 16 moves forward and backward freely along the conveying direction with two horizontal slide shafts 17 as a guide. The speed of forward motion along the conveying direction of an injecting section (manifold) 10 is set to be synchronized with the conveying speed of a continuous belt conveyor 9, and the injecting section moves forward at the same speed as the conveying speed of a continuous belt conveyor 9 while injecting a liquid substance, ascending or descending as well.

Ascended and descended states of an injecting section (manifold) 10 are shown in FIG. 4. Descent of an injecting section (manifold) 10 is preformed by the forward and backward movement of a piston rod 22 to a cylinder 24. Because of the variety of thickness of a block of meat 8, and of increase of the height owing to inflammation of a block of meat 8 by injection of a liquid substance, an injecting section (manifold) 10 has a structure in which it can move upward. For example, a vertical slide lower shaft 27, fixed to an injecting section fixing plate 28 that fixes an injecting section (manifold) 10, can ascend or descend via a vertical slide bearing 26.

As shown in FIGS. 5 and 6, an injecting section (manifold) moves in a cycle of original position, descent, injection, ascent and return to the original position. Though the speed of forward motion along the conveying direction of an injecting section (manifold) 10 is set to be synchronized with the conveying speed of a continuous belt conveyor 9 in order that the injecting section moves forward at the same speed as the conveying speed of a continuous belt conveyor 9 while injecting a liquid substance, ascending or descending as aforementioned, an injecting section (manifold) can be set to return to the original position at a speed faster than the conveying speed. The conveying speed of a continuous conveyor 9, operated continuously at a constant speed, is normally determined by the length of the injecting direction, that is, the length of the conveying direction of an injecting section (manifold) 10, and a cycle period of an injecting operation. For example, where the length of the conveying direction of an injecting section (manifold) 10 is 60 mm and the injection time is 2 seconds at one injection, one cycle period of one injecting section (manifold) 10 is 4 seconds, because an injection is performed incessantly and alternately by two injecting sections (manifolds) 10. The conveying speed would be 3 cm/second in the case where a belt conveyor for a block of meat 9, as shown in FIG. 5 has a width of one row. The conveying speed would be 1.5 cm/second in the case where a continuous belt conveyor 9, as shown in FIG. 6, has a width of two rows.

When a continuous belt conveyor 9 has a width of one row (as illustrated in FIG. 5), an injecting operation is performed at 120 mm pitch, and the distance between two injecting sections (manifolds) 10 is set to be 240 mm, a multiple of 120 mm so that one injecting section can incessantly perform an injection to the point between the points injected by another injecting section. When a continuous belt conveyor 9 is shown in FIG. 6 that illustrates a width of two rows, injecting sections (manifolds) 10 are constituted so that one of them can slide to the rectangular direction against the conveying direction, and subsequently it becomes possible to perform injections in two rows. In this case, two injecting sections (manifolds) 10 perform injections to each row independently, so that the distance between injecting sections (manifolds) 10 can be determined at a user's convenience.

The operation timing of two injecting sections (manifolds) 10 is identical in both cases where continuous belt conveyor 9 as shown in FIG. 5 has a width of one row, and where a continuous belt conveyor 9 as shown in FIG. 6 has a width of two rows. An exemplary timing chart of an injecting section is shown in FIG. 7. The injection pressure generated by the pressure controller is synchronized with an injection in each injecting section 10, a conveying motor is set to rotate in regular direction at a constant speed when an injecting section (manifold) 10 is descending, injecting and ascending, and to rotate in reverse direction when an injecting section 10 is returning to the original position, and to stop when an injecting section 10 is waiting at the original position. All of these operations are performed by commands from the timing controller.

As aforementioned, a switch valve 6 is disposed at a high-pressure piping 5, and consequently, a pressure-controlled high-pressure liquid, issued from a high-pressure plunger pump 4 by the operation of servo motor 3, can be pressed and issued to an injecting section (manifold) 10 in order that two injecting sections can inject a liquid substance incessantly and alternately into a block of meat 8 on a continuous belt conveyor 9 as shown in FIG. 1. The flow of a liquid substance will be explained by example with respect to FIG. 8. FIG. 8 typically shows a structure of the piping unit for a liquid substance in the injector of the present invention. A liquid substance such as brine for curing and the like, contained in a liquid tank 1, is moved to any one of two systems of filter 32 through flow switch valves 30, 31 by a diaphragm pump 2 interlocking with the operation of the servo motor 3, and then filtered. After filtration, the liquid is issued with the pressure controlled by three parallelly located high-pressure pumps through a switch valve 6 disposed to a high-pressure piping 5, a line filter 33 and a flexible hose 7. The liquid is injected from an injecting section (manifold) 10 with the controlled injection pressure. In FIG. 8, 34 represents a pressure sensor, and 35 represents a sensor valve.

Effect of the Invention

By using a pickle injector of the present invention, it becomes possible not only to inject a liquid substance such as brine for curing, seasoning or the like into a block of meat such as pork, beef, livestock meat and the like continuously, and to disperse the liquid substance uniformly but also to perform a uniform dispersion treatment of the liquid substance continuously and at a high speed, and to improve the productivity of a raw ham or the like per unit time and per a device remarkedly.

What is claimed is:

1. A pickle injector for injecting a liquid substance into a block of meat, said pickle injector comprising:

a continuous conveying means having one or more rows for conveying a block of meat;

two or more injecting sections that inject a liquid substance into a block of meat while moving at a speed synchronized with a conveying speed of a block of meat continuously being conveyed by said continuous conveying means; and a pressure controller having a pressure control mechanism which gradually raises the injection pressure from 0 or a low pressure in injecting a liquid substance into a block of meat from said injecting section.

2. A pickle injector according to claim 1, wherein a timing is set so that only one of the two or more injecting sections can perform the injecting operation of injecting a liquid substance to a block of meat.

3. A pickle injector according to claim 1, wherein an injecting section is an injecting section which moves vertically while moving at a speed synchronized with a conveying speed of a block of meat.

4. A pickle injector according to claim 1, wherein two or more injecting sections are located in alignment above and along the continuously conveying direction of a block of meat.

5. A pickle injector according to claim 4, wherein the distance between two or more injecting sections located in alignment is the length figured out by multiplying the product of the length of the injecting sections along the continuously conveying direction of a block of meat and the number of the injecting sections by an integer.

6. A pickle injector according to claim 1, wherein at least one set of two or more injecting sections is located above and along each one of two or more rows for conveying a block of meat.

7. A pickle injector according to claim 1, wherein a pressure control mechanism which can gradually raise the injection pressure from 0 or a low pressure has two or more high-pressure pumps.

* * * * *